LOG PERIODIC BACKWARD WAVE ANTENNA ARRAY

Original Filed Sept. 30, 1960 2 Sheets-Sheet 1

INVENTORS:
Paul E. Mayes
Robert L. Carrel
BY
Merriam, Smith & Marshall
ATTORNEYS

LOG PERIODIC BACKWARD WAVE ANTENNA ARRAY

Original Filed Sept. 30, 1960 2 Sheets-Sheet 2

INVENTORS:
Paul E. Mayes
Robert L. Carrel
BY
Merriam, Smith & Marshall
ATTORNEYS United States Patent Office Re. 25,740
Reissued Mar. 9, 1965

25,740
LOG PERIODIC BACKWARD WAVE ANTENNA ARRAY

Paul E. Mayes, Champaign, Ill., and Robert L. Carrel, Richardson, Tex., assignors to The University of Illinois Foundation, a non-profit organization of Illinois Original No. 3,108,280, dated Oct. 22, 1963, Ser. No. 59,671, Sept. 30, 1960. Application for reissue Mar. 5, 1964, Ser. No. 363,315
17 Claims. (Cl. 343—792.5)

Matter enclosed in heavy brackets [ ] appears in the original patent but forms no part of this reissue specification; matter printed in italics indicates the additions made by reissue.

This invention relates to antennas and more particularly it relates to antennas having unidirectional radiation patterns that are essentially independent of frequency over wide bandwidths.

In the copending application of Dwight E. Isbell, Ser. No. 26,589, filed May 3, 1960, there are described certain antennas comprising coplanar dipole arrays which have an unusually wide bandwidth over which the performance of the antennas is essentially frequency independent and the input impedance nearly constant, the antennas also having a unidirectional pattern with a directivity comparable to a Yagi array. As described in the aforementioned application, these arrays comprise a number of dipoles arranged in side-by-side relationship in a plane, the length of the dipoles and the spacing between adjacent dipoles varying according to a definite mathematical formula, with each of the dipoles being fed at its midpoint by a common feeder which introduces an added phase shift of 180° between connections to successive dipoles. The dipoles which are used to make up the array vary progressively in length, the longest dipole element being about ½ wavelength long at the low frequency limit of a given antenna's effective range and the shortest element being about ⅜ wavelength long at the upper frequency limit.

In accordance with the present invention, it has been found that the directivity of an antenna of the type described in the aforementioned application may be increased and the effective frequency range of an antenna of fixed size may be extended by inclining the dipoles of Isbell to form V-elements, each of which consists of two straight arms of equal length defining an apex which points away from the direction of radiation of the antenna which is also the direction in which the element size decreases. The modification of the straight dipoles of Isbell to V-shaped elements permits the antenna to be operated over bands of frequencies higher than those established, as described above, by the length of the shortest dipole in the antenna, with increased directivity, thus obviously increasing the effective frequency range of a given antenna.

The invention will be better understood from the following detailed description thereof taken in conjunction with the accompanying drawings, in which the same numbers are used to denote corresponding elements in the several views and in which.

Figure 1:
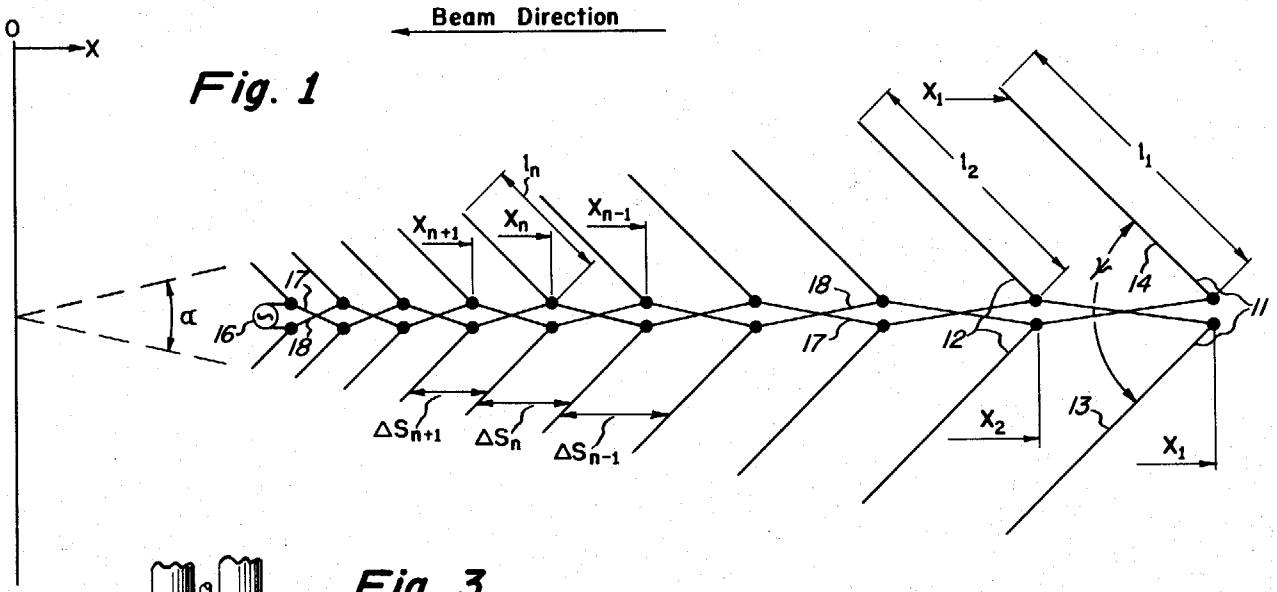
FIGURE 1 is a schematic plan view of an antenna made in accordance with the principles of the invention.

Referring to FIGURE 1, it will be seen that the antennas of the invention are composed of a plurality of V-elements, e.g., 11 and 12, each of which consists of a pair of arms, e.g., 13 and 14, defining an apex in the middle of the V-elements, said V-elements being arranged in a herringbonelike pattern. The arms of a given V-element are equal in length and corresponding arms of the several V-elements, i.e., the arms on the same side of a line passing through the apexes of the V-elements, are substantially parallel to each other. It will be noted that the lengths of the arms of successive V-elements and the spacing between the apexes of the elements are such that the extremities of the elements fall on a pair of straight lines which intersect to form an angle $\alpha$. In the preferred embodiment of the invention the antenna is symmetrical about a line passing through the apexes of the V-elements, as shown.

The antenna is fed at its narrow end from a conventional source of energy, depicted in FIGURE 1 by alternator 16, by means of a balanced feeder line consisting of conductors 17 and 18. It will be seen that the feeder lines 17 and 18 are alternated between connections to consecutive V-elements, thereby producing a phase reversal between such connections.

The length of the arms in the antenna, and the spacing between the V-elements, are related by a constant scale factor $\tau$ defined by the following equations:

$$\tau=\frac{l_{(n+1)}}{l_n}=\frac{\Delta S_{(n+1)}}{\Delta S_n}$$

where $\tau$ is a constant having a value less than 1, $l_n$ is the length of an arm in any intermediate V-element in the array, $l_{(n+1)}$ is the length of an arm in the adjacent smaller V-element, the subscript n designating the nth arm running in an order from larger to smaller, $\Delta S_n$ is the spacing between the apex of the V-element having the arm length $l_n$ and the apex of the adjacent larger V-element, and $\Delta S_{(n+1)}$ is the spacing between the apex of the V-element having the arm length $l_n$ and the apex of the adjacent smaller V-element.

The arms of the individual V-elements forming the antenna array are inclined to point in the direction of decreasing V-element size so that the apex of each of the elements points in a direction away from the angle $\alpha$ formed by the lines passing through the extremities of the individual V-elements.

The angle formed by the arms of a V-element is designated as $\psi$. It will be seen that when the angle $\psi$ is equal to 180°, the antennas of the invention are identical with those described by Isbell in the application mentioned above. In the instant invention, however, the angle $\psi$ preferably has a value between about 50° and 150°.

It will be seen from the geometry of the invention as given above that the distances from the base line O at the vertex of the angle $\alpha$ to the apexes of the V-elements forming the array are defined by the equation:

$$\tau=\frac{X_{(n+1)}}{X_n}$$

where $X_n$ is the distance from the base line O to the apex of the V-element having the arm length $l_n$, $X_{(n+1)}$ is the corresponding distance from the base line to the apex of the adjacent smaller V-element, the $\tau$ has the significance previously given.

The radiation pattern of the antennas of the invention having the geometrical relationship among the several parts, as defined above, is unidirectional in the negative X direction, i.e., extending to the left from the narrow end of the antenna of FIGURE 1.

The use of V-elements in the antennas of the invention, rather than dipoles, increases the directivity of the invention and also permits more effective utilization of a given antenna since the same structure can be used in several frequency modes to achieve coverage of different frequency bands. In the special case of an antenna having straight dipoles rather than V-elements (i.e., when $\psi=180°$), the effective frequency range is that in which the low limit corresponds to that frequency in which the largest dipole in the antenna is about ½ wavelength long and the upper frequency limit to that frequency in which the smallest dipole in the antenna is about ⅜ wavelength long. In general, therefore, it may be said that the frequency range of the straight dipole array corresponds to the mode of operation in which the lengths of the dipoles in the array are about ½ wavelength long. As the frequency is raised above the upper limit of the ½ wavelength mode in the dipole array, the antenna will also be found to radiate effectively at frequencies in which the dipoles are about 3/2 wavelengths long (the 3/2 wavelengths mode), 5/2 wavelengths long (the 5/2 wavelengths mode) and so on. At frequencies above the half-wavelength mode, however, the radiation pattern of the dipole array becomes multilobed and is, therefore, of limited usefulness. By inclining the arms of the dipole to form the V-elements of the instant invention, it has been found that a single lobe of improved directivity may be obtained as the frequency is raised from the half-wavelength mode through the intervening ranges to the 9/2 wavelengths mode and beyond. For each mode of operation there exists an optimum value for the angle $\psi$, ranging from about 114° for the half-wavelength mode to about 62° for the 9/2 wavelengths mode. By using a compromise value for $\psi$ within this range, however, a practical antenna can be made to achieve acceptable performance over several modes of operation, thereby increasing its effective range without increasing the number of elements therein. This result is possible since many of the elements forming the antenna array are used at more than one frequency.

Figure 3:
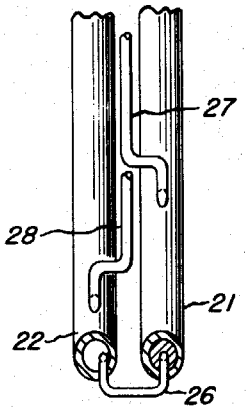
FIGURE 3 is a fragmentary view of an improved and preferred form of an antenna similar to that shown in FIGURE 2, as seen from a point directly in front of and above the narrow end of the antenna.
Figure 2:
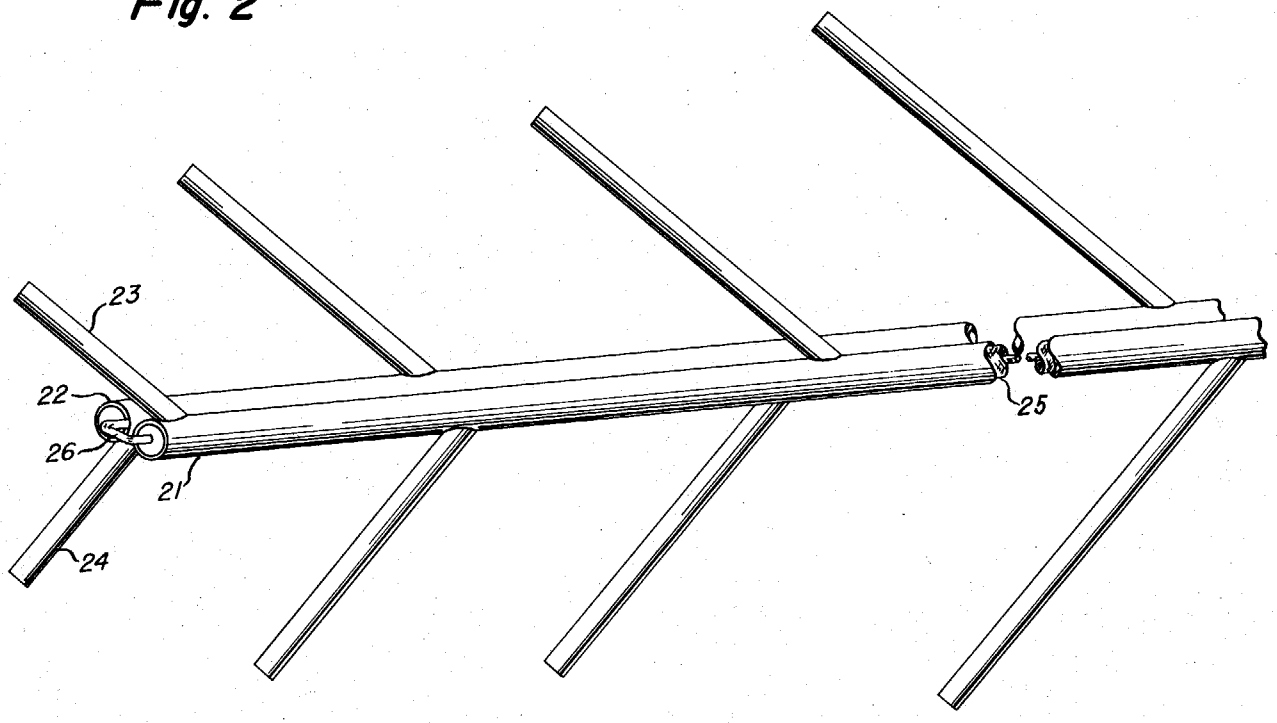
FIG. 2 is a perspective view of a practical antenna embodying the invention.

The construction of an actual antenna made in accordance with the invention is shown in FIGURE 2. In this antenna the balanced line consists of two closely-spaced and parallel electrically conducting small diameter tubes 21 and 22 which also act as a mechanical support for the dipole elements and to which are attached the arms which form the V-elements of the invention. It will be noted that each of the two arms, e.g., 23 and 24, making up one V-element is connected to a different one of said conductors 21 and 22. Moreover, considering either one of the conductors 21 and 22, consecutive arms along the length thereof extend in opposite directions. It will be seen that this construction has the effect of alternating the phase of the connections between successive V-elements, as depicted schematically in FIGURE 1. Although the V-elements of FIGURE 2 are not precisely coplanar, differing therefrom by the distance between the parallel conductors 21 and 22, in practice this distance is usually small so that the arms of the V-elements are substantially coplanar and the advantages of the invention are maintained. In some instances, however, it may be advantageous to bend the individual arms, e.g., 27 and 28, close to the point of attachment to the feeder line, as shown in FIGURE 3, so as to position all the arms in the same plane. The antennas of FIGURES 2 and 3 may be conveniently fed by means of a coaxial cable 25 positioned within conductor 21, the outer conductor of the cable making electrical contact with conductor 21 and the central conductor 26 of the cable extending to and making electrical connection with conductor 22, as shown.

The antennas of the invention may also be fed by a balanced two wire line which is twisted between elements to achieve the desired phase reversal. Other methods of achieving the desired phasing may be employed, e.g., transmission line loops or stubs.

As an example of the invention, an antenna of the type shown in FIGURE 3 was constructed using 0.125" diameter tubing for the balanced line and 0.050" diameter wire for the arms of the V-elements. The arms were soldered to the feeder line and the array was fed by a miniature coaxial cable inserted into one of the conductors of the balanced line. The antenna had 25 arms, the largest of which was 1 ft. long with the shortest being about 3½" long. The antenna was further defined by the parameters $\tau=0.95$ and $\psi=70°$. This antenna exhibited typical directivity gains ranging from 12 db over isotropic in the 3/2 wavelengths mode to 17 db in the 7/2 wavelengths mode, with essentially constant input impedance within each mode.

Except with respect to the angle of inclination of the arms of the V-elements, the parameters which define the antennas of the invention are essentially similar to those of the corresponding straight dipole arrays in which the arms extend at right angles from the feeder lines. Thus, the parameter $\tau$ preferably has a value between about 0.8 and 0.95 and the angle $\alpha$ suitably ranges between 20° and 100°. Moreover, the upper and lower limits of the bandwidth for the ½ wavelength mode of operation can be adjusted as desired by making the longest V-element correspond in length to about ½ wavelength at the lower limit and the shortest V-element to about ⅜ wavelength at the upper frequency limit.

In addition to its use as a direct radiator or receiver, the resonant-V array of the invention has several advantages over other antennas currently used as primary feeds for parabolic and other reflectors. Its independence of frequency in any single mode assures constant illumination of the reflector. Moreover, the input impedance remains essentially independent of frequency so that no tuning is required as the frequency is varied.

The foregoing detailed description has been given for clearness of understanding only, and no unnecessary limitations should be understood therefrom, as modifications will be obvious to those skilled in the art.

What is claimed is:

1. A broadband unidirectional antenna comprising an array of a plurality of V-elements in a planar herringbonelike ararngement, each of said elements having a pair of equal arms defining an apex, the apexes of said V-elements lying on a straight line, the corresponding arms of said elements progressively increasing in length and spacing, the extremities of the arms of said V-elements substantially falling on a V-shaped line forming an angle $\alpha$ at its vertex, the apexes of said V-elements pointing in a direction away from the vertex of said angle $\alpha$, the ratio of the arm lengths of any pair of adjacent V-elements being given by the formula $$\frac{l_{(n+1)}}{l_n}=\tau$$

where $l_n$ is the length of an arm in the larger of said pair of V-elements, $l_{(n+1)}$ is the length of an arm in the adjacent smaller V-element of said pair, the subscript n designating the nth arm running in an order from larger to smaller, and $\tau$ is a constant having a value less than 1, the spacing between the apexes of said V-elements being given by the formula $$\frac{\Delta S_{(n+1)}}{\Delta S_n}=\tau$$

where $\Delta S_n$ is the spacing between the V-element having the arm length $l_n$ and the adjacent larger V-element, $\Delta S_{(n+1)}$ is the spacing between the V-element having the arm length $l_n$ and the adjacent smaller V-element, and $\tau$ has the significance previously assigned, said V-elements being adapted to be fed as a group from the small end of the individual V-elements fed at the apexes thereof by a common feeder which introduces an additional 180° phase shift between successive V-elements.

2. The antenna of claim 1 wherein the angle formed by the arms of any V-element at the apex thereof has a value within the range from about 50° to about 150°.

3. The antenna of claim 1 which is symmetrical about a line passing through the apex of each V-element therein, and in which the corresponding arms of the V-elements are parallel.

4. The antenna of claim 1 in which the angle $\alpha$ has a value between about 20° and 100° and the constant $\tau$ has a value between about 0.8 and 0.95.

5. A broadband unidirectional antenna comprising a balanced feeder line consisting of two closely spaced, straight and parallel conductors, a plurality of substantially coplanar V-elements, each V-element comprising a pair of arms of equal length defining an apex, one of said arms of each V-element being connected at the apex of said V-element to one of said conductors, the other of said arms being connected directly opposite the first to the other of said conductors, the arms of any V-element extending in opposite directions at an acute angle to the plane determined by said conductors, consecutive arms on each of said conductors extending on opposite sides of said plane, the ratio of the lengths of the arms in adjacent V-elements being given by the formula $$\frac{l_{(n+1)}}{l_n}=\tau$$

where $l_n$ is the length of an arm of a V-element, $l_{(n+1)}$ is the length of an arm in the adjacent smaller V-element, the subscript n designating the nth arm running in an order from larger to smaller, and $\tau$ is a constant having a value less than 1, the spacing of the apexes of the V-elements along said feeder line being given by the formula $$\frac{\Delta S_{(n+1)}}{\Delta S_n}=\tau$$

where $\Delta S_n$ is the spacing between the V-element having the arm length $l_n$ and the adjacent larger V-element, $\Delta S_{(n+1)}$ is the spacing between the V-element having the arm length $l_n$ and the adjacent smaller V-element, and $\tau$ has the significance previously assigned.

6. The antenna of claim 5 in which the angle formed by said arms with the plane determined by said feeder line, measured in a plane perpendicular to said plane, has a value between about 25° and about 75°.

7. The antenna of claim 5 in which $\tau$ has a value of about 0.8 to 0.95.

8. An aerial system for wide-band use comprising a plurality of herringbone-like conducting V-elements planarly arranged, a two-conductor balanced feeder connected to each of said elements at substantially the inner end thereof, each two opposite V-elements forming a pair constituting dipole halves, the connection from each adjacent dipole section being to a different feeder, said V-elements being selectively spaced from each other, each V-element of each pair having arms of substantially equal length substantially defining an apex with the apexes of the plurality of V-elements all lying in substantially a straight line and terminating at the feeder, the said dipoles of each pair being of different electrical lengths with successive dipoles differing in electrical length with respect to each other by substantially the same scale factor, each dipole and the feeder between successive dipoles constituting a cell, and the selective spacings between adjacent dipoles decreasing from one end to the other with the greater spacing being between the longest dipoles and being such that the combination of dipole lengths and spacings provides a substantially uniform wide-band response over a plurality of frequency bands bearing substantially harmonic frequency relationships to each other, the connection between the dipoles and the feeder being made in such a manner that the directive gain of the antenna increases as operation shifts from one band to an adjacent band of higher frequencies, and means to connect the feeder to an external circuit at a location substantially removed from the longest of the V-elements and in the direction of the smallest of the V-elements.

9. An aerial system for wide-band use including a two-conductor balanced feeder extending in a selected plane, a plurality of herringbone-like conducting V-elements planarly arranged and spaced along the feeder, each of the elements having a pair of arms of substantially equal length defining substantially an apex with the apexes of the plurality of V-elements all lying in substantially a straight line and all terminating at the feeder, a connection between each of the V-elements and one of the feeders at the inner end of the elements, the two V-elements forming each pair constituting dipole halves, adjacent dipole sections being connected to different feeders, each of the pairs of dipoles being of different electrical lengths with successive dipoles differing in electrical length with respect to each other by substantially a common scale factor, each dipole and the feeder connected thereto in the region between one dipole pair and the next adjacent dipole pair constituting a cell, the spacings between the dipoles as connected to the feeders differing from each other also by substantially the same common scale factor, the scale factor being so chosen that the combination of dipole lengths and spacings providing the several cells have a substantially uniform wide-band response over several frequency bands bearing substantially harmonic frequency relationships to each other, the connection between the feeder and the dipoles being made in such a manner that the directive gain of the antenna increases with operational shift from one band to another band of higher frequency, and means to connect the feeder to an external circuit at a location substantially removed from the longest of the V-elements in the direction of the smallest of the V-ealements.

10. An aerial system for wide-band use including an elongated two-conductor balanced feeder, a plurality of herringbone-like conducting V-elements planarly arranged and spaced along said feeder, each of the elements having a pair of arms of equal length defining substantially an apex with the apexes of the plurality of V-elements all lying in a substantially straight line, a connection between each of the V-elements and the feeder to terminate the elements substantially at the feeder, the two V-elements forming each pair constituting dipole halves, adjacent dipole sections of the plurality being connected to different feeders and the dipoles being relativtely spaced so that the spacings between successive dipoles differ from each other by substantially a common scale factor, adjacent dipole sections having different electrical lengths, each dipole and the feeder connected between it and the adjacent dipole constituting a cell, the lengths of the dipoles increasing from end of array where spacings between adjacent dipoles is less to end of the array where adjacent dipoles are spaced the greatest distance, the spacings by the scale factor variation between adjacent dipoles being such that a combination of the various dipole lengths and spacings provides a substantially uniform wide-band response over several frequency bands bearing substantially harmonic frequency relationships to each other, the connection being made in such a manner that the directive gain of the antenna increases as the operation shifts from one band to another band of higher frequency, and means to connect the feeder to an external circuit at a location substantially removed from the longest of the V-elements in the direction of the smallest of the V-elements.

*11. An antenna system for wide-band use comprising a plurality of at least three linear dipole elements, each dipole composed of two conducting elements planarly arranged in V-formation with the smaller angle between the axes of the elements being in the range from about 62° to 114°, all dipoles lying substantially in a common plane to form a herringbone-like pattern, a two-conductor balanced feeder connected to said elements at substantially the inner ends thereof, said ends being at substantially the apex of each V-formation dipole, the connection from each adjacent dipole section being to a different feeder and the V-formation dipoles being spaced from each other in a gradually decreasing manner from the longest to the shortest, the two elements of each V-formation dipole being of equal length and successive elements being of electrical lengths which differ from one dipole to the* next by a substantially constant scale factor, the apexes of all elements lying in substantially a straight line and all apexes being approximately on the axis of the feeder, and means to connect the feeder elements to an external circuit at a location which is substantially removed from the longest of the dipole elements in the direction of the smallest dipole elements.

12. An antenna adapted for use over a wide frequency spectrum comprising a multiplicity of substantially coplanarly positioned conducting elements, each element forming half of a dipole with corresponding dipole halves positioned substantially parallel to one another and the two elements of each dipole being of substantially the same length, the electrical lengths of the dipole elements of adjacent dipoles differing by a factor which is substantially the same throughout the antenna so that a progressive length change occurs between the longest and shortest elements, the electrical length of each dipole being approximately an odd multiple of a half wavelength at a frequency within the operating spectrum over which the antenna is to provide a maximum response, the dipole elements of each dipole pair being arranged in V-formation and the elements forming an angle between each other in the region of the open portion of the V-formation which is in the range between about 62° and 114°, a pair of feeder conductors for feeding each pair of dipole elements, one dipole element of each pair being connected to one feeder conductor and the other dipole element of each dipole pair being connected to the opposite feeder conductor, adjacent dipole elements of different dipole pairs being connected to opposite feeder conductors and spaced along the feeders to provide a gradual spacing variance from one end to the other whereby the directive gain of the antenna increases as its operation shifts from one frequency range where the element lengths are approximately an odd integral number of half wavelengths to the next higher frequency range where the element lengths are once more approximately an odd integral number of half wavelengths, and means to connect the feeder elements to an external circuit at a location which is substantially removed from the longest dipole elements in the direction of the shortest dipole elements.

13. An antenna adapted for operating over a wide frequency spectrum comprising a plurality of pairs of conducting linear elements forming dipoles and being so positioned that the elements of each pair are arranged in substantially V-formation and so that all pairs are substantially coplanar and all elements which form each half of the several dipoles are substantially parallel to each other, a pair of feeder conductors for establishing electrical connection between the dipole elements and an external circuit, the individual dipole elements of each pair being so connected to the feeder conductors that one dipole element connects with one conductor and the other dipole element connects with the other conductor, the connections of adjacent dipole elements of each pair being reversed so that the adjacent dipole elements are connected to opposite conductors of the feeder pair, the dipole elements of the several pairs being arranged so that the inner ends of each dipole terminate at substantially the feeder conductors and the angular separation between each dipole element in the region of the open V-formation is in the range from about 62° to about 114°, the dipole elements of each of the several pairs of V-formation dipole elements differing in electrical length progressively and uniformly from each other according to a substantially constant scale factor, the longest dipole elements connecting substantially to one end of the feeder conductors and the smallest of the dipole elements connecting substantially to the opposite end of the feeder conductors, the dipole lengths all being approximately odd multiples of a half wavelength at a frequency within the operating spectrum over which maximum response is achieved and the lengths of the progressively and uniformly changing dipole elements relative to each other being such that in the direction from the longest dipole element to the shortest dipole element the lengths change substantially in accordance with a scale factor lying within the range between 0.80 and 0.95 and the particular frequency at which the individual dipoles provide maximum response progressively changes from the lowest in the operating spectrum near the longest dipole to the highest in the spectrum near the shortest dipole, the parallelly positioned pairs of adjacent dipoles being spaced relative to each other along the feeder substantially according to a selected scale factor determined by the spacing between any two adjacent pairs of dipoles so that the assembly provides substantially log-periodic antenna properties, and means to connect an external circuit to the pair of feeder elements at a location along the feeder conductors substantially removed from the longest of the dipole elements in the direction of the shortest of the dipole elements.

14. An antenna system for wide-band use comprising a minimum of three pairs of conducting V-positioned linear elements substantially coplanarly arranged, a two-conductor balanced feeder connected to said elements at substantially the inner ends thereof, one element of each pair of linear elements being located on the opposite side of the feeder from the other element of the pair with the said elements forming a pair constituting the two halves of a dipole, adjacent elements of the dipoles being parallelly positioned and connected to a different conductor of the balanced feeder, said V-positioned elements all being selectively spaced from each other, the V-positioned elements of each dipole having substantially the same length and each V-positioned dipole substantially defining an apex with the apexes of all of the plurality of V-positioned elements lying substantially in a straight line along the balanced feeder, the smaller angle between the axes of the linear dipole elements being in the range between about 62° and 114°, the electrical length of the linear dipole elements decreasing from one end of the feeder to the other, each dipole and the feeder between adjacent dipoles constituting a cell, the dimension of the several cells measured from the point of connection of one dipole and the feeder to the outer end of the next electrically smaller adjacent dipole also decreasing from one cell to the next in the direction of decreasing dipole length according to a scale factor which is substantially the same for all pairs of adjacent cells along the feeder so that the combination of cells provides a substantially uniform wide-band response over a plurality of frequency bands, the maximum spacing between adjacent dipoles being selected so that the directive gain of the antenna increases as operation shifts from one frequency band to at least one other band of a higher frequency, and means to connect the feeder elements to an external circuit at a location which is substantially removed from the longest of the V-positioned dipole elements in the direction of the shortest of the dipole elements.

15. An antenna system for wide-band use comprising a plurality of spaced linear conducting elements all located substantially coplanarly, the conducting elements being positioned to provide a plurality of V-formation arrangements with each V-formation arrangement including two elements and the plurality providing at least three V-formations, a two-conductor balanced feeder having one conductor connected substantially to the inner end of one element of each V-formation at a point approximately at the V-apex and the other conductor connected substantially to the inner end of the second element of each V-formation also approximately at the V-apex, the elements on each side of the feeder being substantially parallelly positioned, adjacent elements on the same side of the feeder being connected to different conductors of the feeder, the elements of each V-formation dipole having substantially the same length with all V-apexes lying substantially in a straight line, the V-formation elements being spaced from each other along the balanced feeder with each

*dipole and the feeder between successive dipoles constituting a cell, the electrical length of each of the adjacent dipoles decreasing from the dipoles connected to the one end of the feeder to those connected to the other end of the feeder, the cell dimension measured from the point of connection of one dipole and the feeder to the outer end of the next electrically smaller adjacent dipole also decreasing from one end of the feeder to the other in the same direction substantially according to a common scale factor, such combination of cells providing a substantially uniform wide-band response over a plurality of frequency bands, the maximum spacing between adjacent dipoles being selected so that the directive gain of the antenna increases as operation shifts from one frequency band to at least one other band of higher frequency, and means to connect the feeder elements at a region substantially removed from the longest dipole elements and in the direction of the smallest dipole elements to an external circuit.*

*16. An antenna system for wide-band use comprising a minimum of three pairs of linear conducting elements arranged substantially coplanarly and in* V*-formation with the apexes of all* V*-formations being in substantially a straight line, each pair of elements comprising each* V*-formation providing the halves of a dipole, a two-conductor feeder extending substantially along the line of the apexes of the* V*-formation conducting elements, the elements which provide the sides of each* V*-formation dipole half all being substantially parallel and there being a connection from such linear elements to the feeder from substantially the end of the element at the* V*-formation apex, adjacent parallel linear conducting elements being connected to different conductors of the feeder so that the halves of the dipoles connect to different conductors of the feeder and adjacent dipoles are reversely connected, the halves of the* V*-formation elements of each dipole being substantially the same length, adjacent dipole elements being spaced from each other along the feeder, the electrical length of the linear conducting elements providing the* V*-formation dipoles decreasing from one end of the feeder to the other in accordance with a selected common scale factor representing the ratio of lengths between any two adjacent dipoles, each dipole and the feeder between it and the adjacent dipole constituting a cell, the dimension of the several cells measured from the point of connection of one dipole and the feeder to the outer end of the next electrically smaller adjacent dipole also decreasing from one cell to the next in the direction of decreasing dipole length according to a scale factor which is substantially the same for all pairs of adjacent cells along the feeder so that the combination of cells provides a substantially uniform wide-band response over a plurality of selected frequency bands, and means to connect an external circuit to the feeder elements at a location which is substantially removed from the longest of the* V*-formation dipole elements in the direction of the shortest of the* V*-formation dipole elements.*

*17. An antenna system for wide-band use comprising a minimum of three pairs of linear conducting elements arranged substantially coplanarly and in* V*-formation with the apexes of all* V*-formation linear conducting elements being in substantially a straight line, each pair of elements comprising each* V*-formation providing the halves of a dipole, a two-conductor feeder extending substantially along the line of the apexes of the* V*-formation conducting elements, the elements which provide the sides of each* V*-formation dipole half all being substantially parallel and there being a connection from such linear elements to the feeder from substantially the end of the element at the* V*-formation apex, adjacent parallel linear conducting elements being connected to different conductors of the feeder so that the halves of the dipoles connect to different conductors of the feeder and adjacent dipoles are reversely connected, the halves of the* V*-formation elements of each dipole being substantially the same length, adjacent dipole elements being spaced from each other along the feeder, the electrical length of the linear conducting elements providing the* V*-formation dipoles decreasing from one end of the feeder to the other substantially in accordance with a selected common scale factor representing the ratio of lengths between any two adjacent dipoles, each dipole and the feeder between it and the adjacent dipole constituting a cell, the cell dimension from the inner end of one dipole to the outer end of the next electrically smaller adjacent dipole also decreasing from one cell to the next in the direction from the longer to the shorter dipoles so that the combination of cells provides a substantially uniform wide-band response over a plurality of selected frequency bands, and means to connect an external circuit to the feeder elements at a location which is substantially removed from the longest of the* V*-formation dipole elements in the direction of the shortest of the* V*-formation dipole elements.*

References Cited by the Examiner

The following references, cited by the Examiner, are of record in the patented file of this patent or the original patent.

UNITED STATES PATENTS

| | | | |
|---|---|---|---|
| 2,192,532 | 3/40 | Katzin | 343—792.5 |
| 2,429,629 | 10/47 | Kandoian | 343—853 |
| 2,817,085 | 12/47 | Schwartz et al. | 343—814 |
| 2,964,748 | 12/60 | Radford | 343—792.5 |

FOREIGN PATENTS

| | | |
|---|---|---|
| 408,473 | 4/34 | Great Britain. |
| 574,323 | 4/59 | Canada. |

OTHER REFERENCES

Channel Master Corp., "K.O." Antenna, copyright 1955, 3 pages.

IRE Transaction on Antennas and Propagation, May 1960; vol. AP–8, No. 3, pages 260–267.

HERMAN KARL SAALBACH, *Primary Examiner.*

ELI LIEBERMAN, *Examiner.*